United States Patent Office 3,803,126
Patented Apr. 9, 1974

3,803,126
2-AZAINOSINE
Robert J. Rousseau, Laguna Niguel, and George A. Ivanovics, Balboa, Calif., assignors to ICN Pharmaceuticals, Inc., Pasadena, Calif.
No Drawing. Filed Feb. 28, 1972, Ser. No. 230,128
Int. Cl. C07d 51/54
U.S. Cl. 260—211.5 R                16 Claims

ABSTRACT OF THE DISCLOSURE 2-azainosine, its 5'-phosphate, and glycosyl hydroxyl-blocked analogs thereof are prepared by diazotization and cyclization of corresponding AICA ribosides and ribotides at from —40° C. to —18° C. in an acidic environment sufficient to protonate the imidazo ring of the starting material. The compounds of the invention display in vitro antiviral properties.

BACKGROUND OF THE INVENTION

The concept of modifying purine bases found naturally in DNA and RNA has been utilized to obtain biologically active compounds. Those efforts are reviewed, by L. L. Bennet et al. in "Methods in Cancer Research," ed. H. Busch, vol. 3, Academic Press (1967), p. 549. Replacement of a ring carbon with a nitrogen atom to obtain corresponding "8-azapurine" nucleosides has been proposed, and Montgomery and Thomas have recently, in Chem. Commun., 458 (1969), reported the preparation of "2-azaadenosine" from adenosine $N^1$-oxide, a procedure culminating in cyclization of 5-amino-1-β-D-ribofuranosyl)-imidazole-4-carboxamidine with sodium nitrate in aqueous acetic acid. The compound is reported to be cytotoxic to human epidermoid carcinoma cells.

We conceived that the previously unprepared compound 7 - (β-D-ribofuranosyl)-imidazo[4,5-d]-v-trizin-4-one [hereafter, "2-azainosine"] could be obtained by diazotization and cyclization of the known compound 5-amino - 4 - carboxamido-1-(β-D-ribofuranosyl)-imidazole ["AICA-riboside"], i.e.:

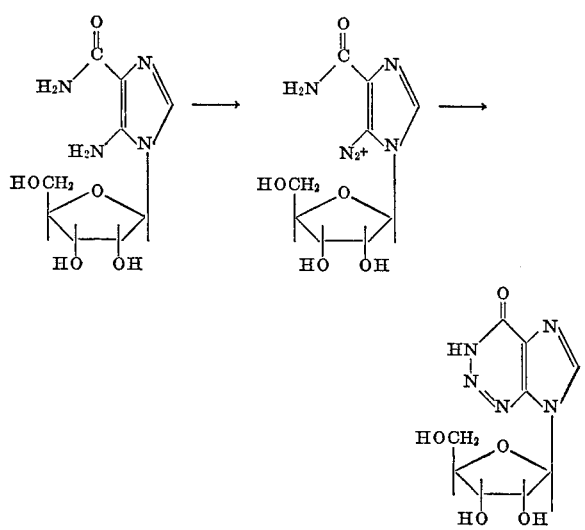

Attempts to do so with sodium nitrite in aqueous acetic acid, however, yielded only a deep red dyelike material. However, in a related experiment whose object was fluorination of 2',3',5'-tri-O-acetylated AICA riboside, treatment with sodium nitrite in 50% fluoboric acid yielded no fluoro derivative but instead afforded the correspondingly blocked 2-azainosine compound. From these experiments we surmised that suppression of diazo coupling by protonation of the imidazo ring in strong acid is a prerequisite to obtainment of 2-azainosine and its analogs.

BRIEF SUMMARY OF THE INVENTION

According to this invention there are provided antiviral and tumor cell-inhibitory compounds of structure:

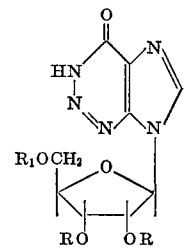

wherein R is hydrogen or a glycosyl hydroxyl-blocking group, e.g., acyl or sulfonyl, and $R_1$ is hydrogen, $PO_3H_2$, or a similar blocking group, as well as novel methods of obtaining the same by diazotization and cyclization of AICA-riboside and appropriate analogs thereof under acidic conditions sufficient to protonate the imidazo ring of the starting materials. The compounds of the invention are obtained in excellent yield notwithstanding the recognized susceptibility of glycosidic linkages to acidic hydrolysis.

DESCRIPTION OF THE PREFERRED EMBODIMENTS

Diazotization of the AICA starting material may be effected with any suitable reagent, e.g., nitrous acid, potassium nitrite, amyl nitrite. Preferably, sodium nitrite is employed in excess of the stoichiometric requirement. Cyclization of the diazonium ion-containing intermediate is effected in the presence of strong acid sufficient in kind and concentration to protonate the imidazo ring, thereby preventing diazo-coupling side reactions. In order to aovid acid hydrolysis of the glycoside linkage, cyclization is had at a temperature within the range from about —40° C. to about —18° C., preferably about —20° C. to about —25° C. At these temperatures, freezing of the acidic reaction medium is avoided by appropriate choice of acid normality. Generally, the reaction medium must be more acid than pH—1 (e.g., more acidic than 2N HCl) in order that the acid required for protonation of the imidazo ring remain liquid at reaction temperature. Preferably, 6 N HCl is employed. Other suitable acids include, e.g., HF, HBr, HI and $HBF_4$ in normality appropriate to the ends described above.

Workup of product entails neutralization with base, so that 5'-phosphate products are most commonly obtained in the form of a salt resulting from that neutralization step. Thus, for example, workup with NaOH affords the mono- or disodium phosphate salt, depending upon the pH at which crystallization is effected. Ammonia base or appropriately chosen alkali metal or alkaline earth metal base, then, yields the 5'-phosphate in the form of its physiologically acceptable salts. Where desired, the free nucleotide may be obtained therefrom, as by acidification or passage through a cationic exchange resin such as Dowex 50 ($H^+$) resin.

Sutherland et al., in Biochim. et Biphys. Acta 148, 106 (1967) have demonstrated that acylation of cyclic nucleotides enhances cellular transport. Similarly, lipid solubility of the free nucleotides and nucleosides of this invention may be enhanced by acylation or sulfonylation of glycosyl hydroxyl groups, either before or following cyclization of the AICA precursors therefor. Acyl groups may be $C_1$–$C_{18}$ acyl, e.g., benzoyl, preferably $C_1$–$C_4$ acyl, e.g., acetyl. Alkyl or alkaryl sulfonyl groups may be employed, e.g., tosyl, mesyl, brosyl, nisyl, etc., as is well known.

The invention is further illustrated and described in the examples of preferred embodiments which follow.

EXAMPLE 1

7-(β-D-ribofuranosyl)-imidazo[4,5-d]-v-triazin-4-one (2-azainosine, Compound 1)

5-amino-4-carboxamido - 1 - (β-D-ribofuranosyl)imidazole (2.58 g., 10 mmoles) was dissolved in 6 N HCl (50 ml.) at −25° C., treated with a solution of $NaNO_2$ (2.1 g., 30 mmoles) and then stirred for 30 minutes. The pH of the reaction mixture was carefully adjusted to 7.5 cold, saturated aqueous NaOH, while the temperature of the reaction mixture was controlled below −20° C. The rapidly stirred slurry was allowed to warm to room temperature and the crude product was collected by filtration, dried, and then dissolved in warm $H_2O$ (60° C., 7 ml.). The pH of the solution was adjusted to 4 with conc. HCl. On cooling colorless needles deposited which were collected to yield (1.37 g.). The mother liquor was concentrated in vacuo to a small volume. On cooling a second crop (0.92 g.) was obtained. Yield: 2.29 g. (86%) M.P. 173–175° C. $[\alpha]_D^{25}$ = −36.0 (c.=1, $H_2O$)

$\lambda_{max.}^{pH\ 1}$ 285 nm. (ε 4,500); $\lambda_{max.}^{pH\ 11}$ 292 nm. (ε 6,700)

Analysis.—Calcd. for $C_9H_{11}N_5O_5$ (percent): C, 40.15; H, 4.12; N, 26.02. Found (percent): C, 40.08; H, 4.27; N, 26.31.

EXAMPLE 2

7-(2,3,5-tri-O-acetyl-β-D-ribofuranosyl)-imidazo[4,5-d]-v-triazin-4-one (Compound 2)

19.2 g. (50 mmoles) of 5-amino-4-carboxamido-1-(2',3',5'-tri-O-acetyl-β-D-ribofuranosyl) - imidazole (Suzuki et al., U.S. Pat. 3,450,693) was dissolved in cold 6 N HCl (−25° C., 250 ml.) and treated with aqueous 3 M $NaNO_2$ (30 ml.). After this solution was stirred for 25 minutes $N_2$ gas was passed through the reaction mixture and the pH was adjusted to 5 with conc. aqueous NaOH, while the temperature of the reaction mixture was maintained below −20° C. The reaction mixture was allowed to warm to room temperature and then was extracted with two portions of $CHCl_3$ (400 ml. each). The $CHCl_3$-extracts were combined, dried over anhydrous $Na_2SO_4$, and evaporated to dryness in vacuo. The crude product was dissolved in hot EtOH (140 ml.), seeded with crystals obtained from previous small reaction and kept at −15° C. for 16 hours. The crystalline material which deposited was collected by filtration and recrystallized from boiling EtOH (90 ml.). Yield: 11.65 g. (63%). M.P. 79–80° C. (sinters) dec. at 90° C., $[\alpha]_D^{25}$ = −17.6° (c.=1, $CHCl_3$)

$\lambda_{max.}^{pH\ 1}$ 285 nm. (ε 4,300); $\lambda_{max.}^{pH\ 11}$ 292 nm. (ε 6,500)

Analysis.—Calcd. for $C_{15}H_7N_5O_8$ (percent): C, 45.57; H, 4.33; N, 17.72. Found (percent): C, 45.99; H, 4.55; N, 17.52.

EXAMPLE 3

7-(β-D-ribofuranosyl)-imidazo[4,5-d]-v-triazin-4-one-disodium 5'-phosphate (Compound 3)

3.38 g. (10 mmoles) of 5-amino-4-carboxamido-1-(β-D-ribofuranosyl)-imidazole - 5' - phosphate [Saito Japanese Pat. 6,908/67, C.A., 68, 40,025 (1968)] was dissolved in cold (−25° C.) 6 N HCl (50 ml.). The rapidly stirred solution was treated with aqueous 3 M $NaNO_2$ (10 ml.) and then stirred for 30 minutes. The pH of the solution was brought to 6.2 with cold, concentrated aqueous NaOH, while the temperature of the reaction mixture was maintained below −20° C. The temperature was allowed to rise to +5° C. and the crystalline product was isolated by filtration and recrystallized from hot $H_2O$. The product was washed with a small amount of cold $H_2O$, EtOH, then dried to yield 1.92 g. (45%). M.P. 92–94° C., $\lambda_{max.}^{pH\ 1}$ 285 nm. (ε 4,300); $\lambda_{max.}^{pH\ 11}$ 292 nm. (ε 6,000)

Analysis.—Calcd. for $C_9H_{11}O_8N_5PNa_2\cdot 2H_2O$ (percent): C, 25.12; H, 3.51; N, 16.27. Found (percent): C, 25.27; H, 3.39; H, 16.06.

EXAMPLE 4

As an alternative to the general preparative method of Examples 1–3, "2-azainosine" (Compound 1) may be obtained by deacylation of 2. Thus, to methanol saturated at 0° C. with ammonia (150 ml.) was added 7-(2,3,5-tri - O - acetyl-β-D-ribofuranosyl)-imidazo[4,5-d]-v-triazin-4-one (5 g., 1.86 mmoles) and the mixture was stirred at room temperature for 7 hrs. The solvent was removed in vacuo to afford a yellow crystalline solid which was dried over $P_2O_5$ overnight. This residue was triturated with $CH_3CN$ (50 ml.) collected, washed with $CH_3CN$ (30 ml.) then dried to yield 3.3 g. This was dissolved in $H_2O$ (50 ml.) and the solution was acidified with Dowex 50 ($H^+$, 100–200 mesh, 5 g.) to pH 4. The resin was removed and the filtrate was evaporated to dryness to give a light yellow powder (2.6 g.). This was recrystallized from $H_2O$ (18 ml.) and EtOH (72 ml.) to give 1.9 g., M.P. 176–177° (dec. with explosion) which was identical to the product prepared by ring closure of 5-amino-4-carboxamido - 1 - (β - D - ribofuranosyl)-imidazole.

In the foregoing examples, physical properties were determined with the following instruments: M.P., Thomas Hoover apparatus (uncorrected); UV spectra, Cary 15 UV spectrometer (pH 1 and pH 11); specific rotation, Perkin-Elmer Model 141 polarimeter; PMR, Hitachi Perkin-Elmer R20A high-resolution spectrometer ($Me_4Si$ or DSS); and IR spectra, Perkin-Elmer Model 257. Where $H_2O$ of crystallization is indicated, this was confirmed by integration of the $H_2O$ signal in absolute $d_6$ DMSO, addition of $D_2O$ then reintegration.

Preferred compounds of the invention were tested for antiviral activity according to the virus rating (VR) method of R. W. Sidwell and J. H. Huffman, Appl. Microbiol., 22, 797 (1971), wherein VR>1.0 indicates marked antiviral activity, VR 0.5–0.9 moderate antiviral activity, and VR<0.5 insignificant or no antiviral activity. Compound 1 exhibited VR of 0.6 against parainfluenza virus in tissue culture, while Compounds 2 and 3 were active against herpes simplex virus respectively exhibiting VR's of 0.7 and 0.5.

The same compounds were tested in vitro by the method of Sidwell and Huffman, id. for relative cytotoxicity against cancer (KB, HEp-2 and HeLa) and non-cancer (RK–13 rabbit kidney) cell lines. Toxicity was determined by microscopic (200 to 400×) examination. Floating cells or cells with abnormal shapes or ragged edges were indicative of damaged or killed cells resulting from toxicity of the compounds.

In the case of each of Compounds 1, 2 and 3, toxicity was significantly lower against the normal cell line as compared to that against the cancer cell lines, as appears from Table I.

TABLE I

| | Highest non-toxic concentration (mg./ml.) | | | |
|---|---|---|---|---|
| | KB cells | HEp-2 cells | HeLa cells | RK-13 cells |
| Compound: | | | | |
| 1 | 0.32 | 0.32 | 3.2 | 10.0 |
| 2 | 10.0 | 0.32 | 1.00 | 100 |
| 3 | 0.32 | 0.32 | 1.00 | 32.0 |

Having described the invention with especial reference to the preferred embodiments thereof in the manner prescribed by law, we wish it understood that the invention is not limited thereto, but only to the lawful scope of the appended claims.

What is claimed is:

1. A compound of stucture

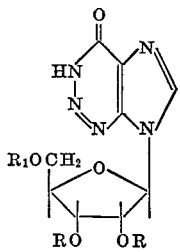

wherein R is hydrogen or $C_1$–$C_{18}$ acyl and $R_1$ is hydrogen, $PO_3H_2$, or $C_1$–$C_{18}$ acyl.

2. A compound according to claim 1 wherein $R_1$ is $PO_3H_2$.

3. A compound according to claim 2 wherein R is hydrogen.

4. A physiologically acceptable ammonium, alkali metal or alkaline earth metal salt of a compound according to claim 2.

5. A physiologically acceptable ammonium, alkali metal or alkaline earth metal salt of a compound according to claim 3.

6. A compound according to claim 1 wherein $R_1$ and R are hydrogen.

7. A compound according to claim 1 wherein R and $R_1$ are acyl.

8. A compound according to claim 1 wherein R and $R_1$ are acetyl.

9. A method which comprises diazotizing the 5-amino group of a compound of structure

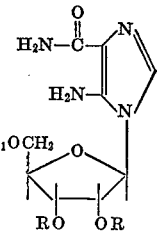

wherein R is hydrogen or $C_1$–$C_{18}$ acyl and $R_1$ is $PO_3H_2$, $C_1$–$C_{18}$ acyl or hydrogen, at a temperature within the range from about $-40°$ C. to about $-18°$ C. in the presence of an acid liquid at the reaction temperature and sufficient in kind and concentration to protonate the imidazo ring of said compound, and thereby effecting cyclization of the diazonium ion-containing product to afford the corresponding glycosyl-blocked or -unblocked 2-azainosine nucleoside or 5-phosphate thereof.

10. The method of claim 9 wherein $R_1$ is $PO_3H_2$ and R is hydrogen.

11. The method of claim 9 wherein $R_1$ and R are hydrogen.

12. The method of claim 9 wherein R and $R_1$ are acyl.

13. The method of claim 12 wherein R and $R_1$ are acetyl.

14. The method of claim 10 wherein said acid is 6 N hydrochloric acid and said temperature from about $-20°$ C. to about $-25°$ C.

15. The method of claim 11 wherein said acid is 6 N hydrochloric acid and said temperature is from about $-20°$ C. to about $-25°$ C.

16. The method of claim 13 wherein said acid is 6 N hydrochloric acid and said temperature is from about $-20°$ C. to about $-25°$ C.

References Cited

UNITED STATES PATENTS 3,296,089   1/1967   Nakayama et al. __ 260—211.5 R
3,332,935   7/1967   Yamazaki et al. __ 260—211.5 R JOHNNIE R. BROWN, Primary Examiner U.S. Cl. X.R.

424—180